(12) United States Patent
You

(10) Patent No.: US 11,495,199 B2
(45) Date of Patent: Nov. 8, 2022

(54) INTEGRATED KARAOKE DEVICE

(71) Applicant: Shenzhen Teana Technology Co., Ltd., Shenzhen (CN)

(72) Inventor: Guangguo You, Shenzhen (CN)

(73) Assignee: Shenzhen Teana Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/342,429

(22) Filed: Jun. 8, 2021

(65) Prior Publication Data

US 2021/0375245 A1 Dec. 2, 2021

Related U.S. Application Data

(63) Continuation of application No. 16/709,730, filed on Dec. 10, 2019, now Pat. No. 11,030,986, which is a
(Continued)

(51) Int. Cl.
*H04R 1/28* (2006.01)
*G10H 1/36* (2006.01)
(Continued)

(52) U.S. Cl.
CPC ....... *G10H 1/361* (2013.01); *H04N 21/42203* (2013.01); *H04N 21/439* (2013.01);
(Continued)

(58) Field of Classification Search
CPC ........ H04R 1/08; H04R 1/083; H04R 1/2869; H04R 1/2873; H04R 1/2876; H04R 1/288; H04R 27/00; H04R 27/04
See application file for complete search history.

(56) References Cited

U.S. PATENT DOCUMENTS 1,403,811 A * 1/1922 Pauly ...................... H04M 1/03
379/433.01
2,218,389 A * 10/1940 Warmbier .............. H04R 27/04
381/75
(Continued)

FOREIGN PATENT DOCUMENTS

CN 1457620 11/2003
CN 101331793 12/2008
(Continued)

OTHER PUBLICATIONS

International Search Report and Written Opinion for International (PCT) Patent Application No. PCT/CN2014/092367, dated Aug. 14, 2015, 5 pages.
(Continued)

*Primary Examiner* — Ryan Robinson
(74) *Attorney, Agent, or Firm* — Sheridan Ross P.C.

(57) ABSTRACT

The present invention discloses an integrated karaoke device, including a microphone and a sound box. The sound box includes a sound chamber containing a loudspeaker. The integrated karaoke device further includes a connecting part made of flexible material that is fixedly connected between a bottom of the microphone and a top of the sound chamber. The use of a flexible material connecting part rather than a solid structural part reduces the transmission to the microphone of sound vibration generated by the sound box. The beneficial effect of implementing the present invention is that a flexible material connecting part is fixedly connected between the bottom of the microphone and the top of the sound chamber, and meanwhile, a gap is kept between the bottom of a printed circuit board (PCB) and the top of the sound chamber; and because the flexible material connecting part can effectively reduce sound vibration, the transmission of vibration to the microphone from the sound box can be
(Continued)

effectively eliminated, thereby preventing squealing, and enabling integration of the microphone and the sound box for use in karaoke.

20 Claims, 3 Drawing Sheets

Related U.S. Application Data continuation of application No. 15/520,369, filed as application No. PCT/CN2014/092367 on Nov. 27, 2014, now Pat. No. 10,504,497.

(51) Int. Cl.
    *H04N 21/422*     (2011.01)
    *H04N 21/439*     (2011.01)
    *H04N 21/81*     (2011.01)
    *H04R 1/08*     (2006.01)
    *H04R 1/04*     (2006.01)
    *H04R 27/04*     (2006.01)

(52) U.S. Cl.
    CPC ......... *H04N 21/8113* (2013.01); *H04R 1/083* (2013.01); *G10H 2210/281* (2013.01); *G10H 2220/211* (2013.01); *G10H 2240/211* (2013.01); *G10H 2240/321* (2013.01); *H04R 1/04* (2013.01); *H04R 27/04* (2013.01); *H04R 2201/028* (2013.01); *H04R 2420/07* (2013.01)

(56) References Cited

U.S. PATENT DOCUMENTS

| | | | | | |
|---|---|---|---|---|---|
| 3,890,474 | A | * | 6/1975 | Glicksberg | H04R 25/356 381/72 |
| 5,208,717 | A | * | 5/1993 | Takao | G11B 25/06 360/1 |
| 5,349,480 | A | * | 9/1994 | Takao | G10H 1/361 360/1 |
| 6,947,566 | B2 | * | 9/2005 | Mears | H04R 27/00 381/75 |
| 8,243,951 | B2 | | 8/2012 | Ishibashi et al. | |
| 10,504,497 | B2 | | 12/2019 | You | |
| 10,911,082 | B2 | | 2/2021 | You | |
| 11,030,986 | B2 | | 6/2021 | You | |
| 2006/0050894 | A1 | * | 3/2006 | Boddicker | B60R 11/0264 381/77 |
| 2006/0217066 | A1 | * | 9/2006 | Giammaria, Jr. | H04R 5/04 455/41.2 |
| 2006/0228683 | A1 | * | 10/2006 | Jianping | G10H 1/366 434/307 A |
| 2021/0234566 | A1 | | 7/2021 | You | |

FOREIGN PATENT DOCUMENTS

| | | | |
|---|---|---|---|
| CN | 202035121 | | 11/2011 |
| CN | 102972043 | | 3/2013 |
| CN | 204272340 | | 4/2015 |
| CN | 204291297 | | 4/2015 |
| JP | 10228288 A | * | 8/1998 |
| JP | H10-228228 | | 8/1998 |
| JP | 2003-108164 | | 4/2003 |
| JP | 2003108164 A | * | 4/2003 |
| KR | 200382291 | | 4/2005 |
| KR | 200382291 Y1 | * | 4/2005 |
| KR | 100764728 | | 10/2007 |
| KR | 100764728 B1 | * | 10/2007 |
| KR | 101726815 | | 4/2017 |
| KR | 101726815 B1 | * | 4/2017 |

OTHER PUBLICATIONS

International Search Report and Written Opinion for International (PCT) Patent Application No. PCT/CN2016/074565, dated Nov. 3, 2016, 3 pages.
Official Action for U.S. Appl. No. 15/520,369, dated Mar. 14, 2019, 16 pages.
Notice of Allowance for U.S. Appl. No. 15/520,369, dated Jul. 24, 2019, 8 pages.
Official Action for U.S. Appl. No. 16/709,730, dated Apr. 3, 2020, 4 pages.
Official Action for U.S. Appl. No. 16/709,730, dated Oct. 16, 2020, 12 pages.
Notice of Allowance for U.S. Appl. No. 16/709,730, dated Feb. 9, 2021, 12 pages.
Official Action for U.S. Appl. No. 15/540,447, dated Sep. 20, 2019, 8 pages.
Official Action for U.S. Appl. No. 15/540,447, dated Mar. 23, 2020, 11 pages.
Notice of Allowance for U.S. Appl. No. 15/540,447, dated Oct. 1, 2020, 9 pages.

* cited by examiner

INTEGRATED KARAOKE DEVICE

CROSS REFERENCE TO RELATED APPLICATIONS

This application is a continuation of U.S. patent application Ser. No. 16/709,730, filed on Dec. 10, 2019, now U.S. Pat. No. 11,030,986, issued on Jun. 8, 2021, which is a continuation of U.S. patent application Ser. No. 15/520,369, filed on Apr. 19, 2017, now U.S. Pat. No. 10,504,497, issued on Dec. 10, 2019, which is a national stage application under 35 U.S.C. 371 and claims the benefit of PCT Application No. PCT/CN2014/092367 having an international filing date of Nov. 27, 2014, which designated the United States, each of which are incorporated herein by reference in their entirety.

TECHNICAL FIELD

The present invention relates to the field of audio playback, and in particular, to an integrated karaoke device.

BACKGROUND ART

In spite of the wide and mature karaoke technology and application thereof, there are few portable simplified devices and even fewer individualized karaoke products, such that karaoke can be used only in special places or fixed places, causing much inconvenience. Moreover, various existing microphones, including microphones having a karaoke reverberation function, have mature technology and wide application, but the microphone is usually a separate, stand-alone microphone product and must be used with an external sound box or other devices. Because the sound box generates, along with the sound, vibration having the same frequency as that of the sound, when the microphone is integrated with or close to the sound box, the sound input from the microphone is amplified by the sound box and then transmitted to the microphone through the housing. The microphone then again inputs and amplifies the sound of the same frequency, and a strong self-feedback effect, that is, self-excitation effect, is produced after repeated amplification many times. At this time, the sound box produces a persistent and continuously strengthened sound of the same frequency (referred to herein as a squeal), completely disrupting the normal use.

Existing designs change the frequency of the sound to make the frequency or frequency phase of the input sound different from the output frequency or frequency phase, thereby avoiding squealing, or remove specific frequencies and so on through actual application or calculation, so as to avoid squealing. However, all these methods cause serious distortion of sounds and cannot meet requirements for desirable sound quality.

Therefore, integration of a microphone and a sound box to achieve portability and a direct karaoke effect, and to enable people to enjoy singing and enjoy the fun of music at any time and any place, with unchanged or even improved sound quality, is an aspiration of many people.

Technical Problem

The technical problem to be solved by the present invention is to provide an integrated karaoke device in view of the defect in the prior art that a strong self-feedback effect is produced that completely disrupts the normal use when a microphone and a sound box are integrated.

Solution to the Problem

Technical Solution

The technical solution adopted in the present invention to solve the technical problem thereof is: an integrated karaoke device is constructed, including a microphone and a sound box, where the sound box includes a sound chamber containing a loudspeaker, and the integrated karaoke device further includes a connecting part made of flexible material that is fixedly connected between a bottom of the microphone and a top of the sound chamber. The use of a flexible material connecting part, rather than a solid structural part, reduces the transmission to the microphone of sound vibration generated by the sound box.

In the aforementioned integrated karaoke device, a plastic part is fixedly connected to the bottom of the microphone and penetrates a top of the flexible material connecting part so as to secure the flexible material connecting part to the microphone. A printed circuit board (PCB) is fixedly connected to the plastic part, and a gap is kept between the PCB and the top of the sound chamber.

In the aforementioned integrated karaoke device, a sidewall of the flexible material connecting part is provided with a first opening and a second opening, the PCB is provided with a first port and a second port, and the first port and the second port are correspondingly fitted in the first opening and the second opening, respectively.

In the aforementioned integrated karaoke device, the sound box further includes a silicone ring, a plastic ring, and a trumpet-shaped mesh that are fixedly connected to a bottom of the loudspeaker in turn. The bottom of the loudspeaker is flush with the bottom of the sound chamber.

In the aforementioned integrated karaoke device, a distance between the PCB and the top of the sound chamber is greater than 4 mm.

In the aforementioned integrated karaoke device, a circuit board is mounted in the microphone and the circuit board is provided with a Bluetooth module.

In the aforementioned integrated karaoke device, the flexible material connecting part is made of silicone.

In the aforementioned integrated karaoke device, the flexible material connecting part is made of any one of rubber, thermoplastic polyurethane (TPU), and soft plastic.

In the aforementioned integrated karaoke device, a bottom of the flexible material connecting part is connected to the top of the sound chamber by means of threads or screws.

In the aforementioned integrated karaoke device, a bottom of the flexible material connecting part is adhered to the top of the sound chamber.

Beneficial Effect of the Invention

Beneficial Effect

The implementation of the integrated karaoke device of the present invention has the following beneficial effect: The top of a flexible material connecting part is fixedly connected to the bottom of a microphone by means of a plastic part, and the bottom of the flexible material connecting part is fixed to the top of a sound chamber. Meanwhile, a gap is kept between the bottom of a PCB that is also fixedly connected to the plastic part and the top of the sound chamber. When a person sings aloud, because the flexible connecting part can effectively eliminate vibration from being transmitted to the microphone from the sound box, sound vibration generated by the sound box is no longer transmitted to the microphone (as it would be if a solid structural part were used instead of the flexible material connecting part), so that the production of a feedback self-excitation mechanism is fundamentally eliminated, thereby effectively inhibiting squealing. Meanwhile, with this product, people can sing karaoke at any time and any place without the restriction of places or numerous devices. Thus, a user can sing a song loudly and share the joy with friends at any time no matter whether he is indoors or outdoors, on a journey or on a mountain top. Additionally, with mobile phones having become now indispensable for people to carry, a wireless Bluetooth connection to the mobile phone can be established by enabling a Bluetooth function of the integrated karaoke device, and a real karaoke effect is achieved with the accompaniment of music played from the mobile phone.

EMBODIMENTS OF THE INVENTION

Implementation Manners of the Present Invention

In order to understand the technical features, objectives, and effects of the present invention more clearly, the specific implementation manners of the present invention will be described in detail with reference to the accompanying drawings.

Figure 1:
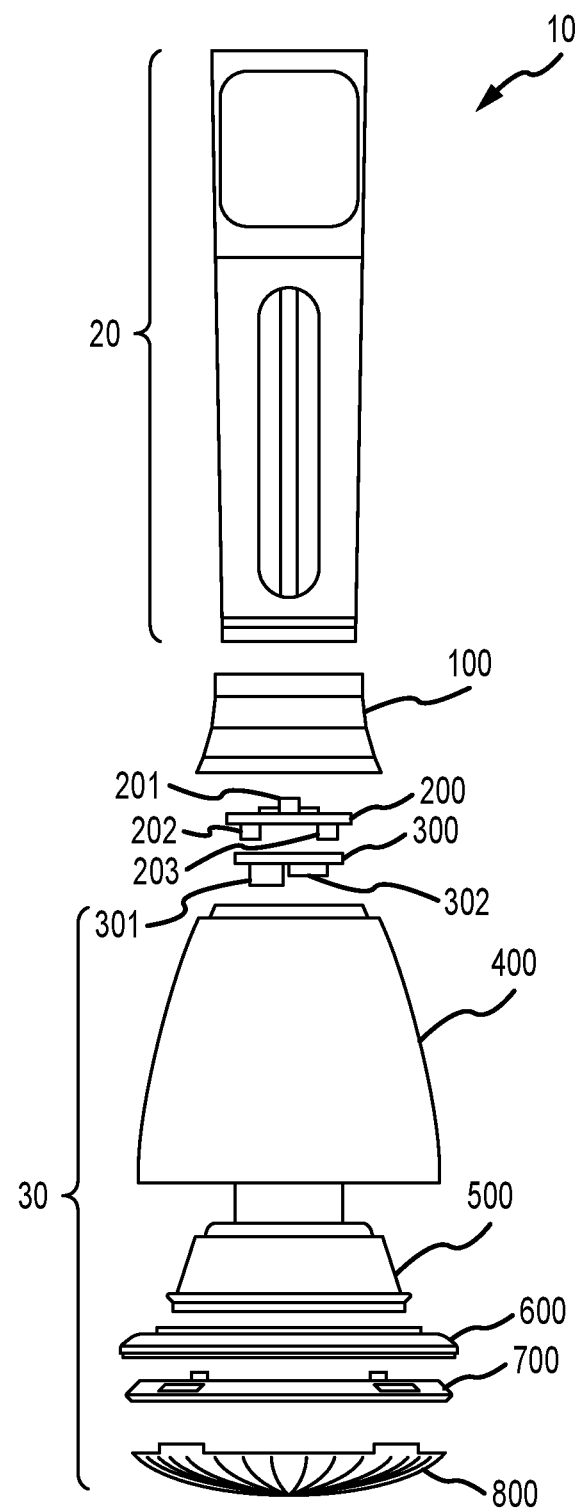
FIG. 1 is a schematic exploded view of a microphone-and-sound-box integrated device in the present invention.

FIG. 1 is a schematic exploded view of an integrated karaoke device 10 according to one embodiment of the present invention. The integrated karaoke device 10 includes a microphone 20 and a sound box 30. The sound box 30 includes a sound chamber 400 that contains a loudspeaker 500. Particularly, the integrated karaoke device 10 includes a connecting part 100 made of a flexible material. The flexible material connecting part 100 has the shape of a cylinder with a closed top and an open bottom, and as shown in FIG. 1, has a diameter gradually increasing from top to bottom. The connecting part 100 is fixedly connected between a bottom of the microphone 20 and a top of the sound chamber 400, and is used to prevent transmission of sound vibration generated by the sound box 30 to the microphone 20, which sound vibration would be transmitted through a solid structural connecting part. The integrated karaoke device also includes a plastic part 200 and a PCB 300. The plastic part 200 mainly has a fixing function. At least one protrusion is provided on each of the top and the bottom of the plastic part 200. For example, one protrusion 201 is provided on the top of the plastic part 200 and two protrusions 202 and 203 are provided on the bottom of the plastic part 200 as shown in FIG. 1. The top protrusion 201 penetrates the top (that is, the end connected to the microphone 20) of the flexible material connecting part 100 and fixes the top of the flexible material connecting part 100 to the bottom of the microphone 20 by means of threads or screws. It should be understood that the top of the flexible material connecting part 100 is provided with several holes for penetration of the protrusion 201 on the plastic part 200 to the bottom of the microphone 20.

The PCB 300 is also fixedly connected by means of the plastic part 200, and a gap is kept between the PCB 300 and the top of the sound chamber 400. Specifically, the PCB 300 is fixed to the bottom of the plastic part 200 by the protrusions 202 and 203 on the bottom of the plastic part 200 by means of threads or screws. Further, the PCB 300 is provided with a first port 301 and a second port 302 in this embodiment, where the first port 301 is a charging/audio input/audio output port, and the second port 302 is an audio output port. It should be understood, however, that the number of the ports is not limited. Meanwhile, a sidewall of the flexible material connecting part 100 comprises two openings (not marked in the figure), which are respectively a first opening and a second opening, and the first port 301 and the second port 302 are correspondingly fitted in the first opening and the second opening respectively. In this way, the previous practice of fitting the two ports in openings on the bottom of the microphone is avoided, thereby achieving a more beautiful appearance. [0023] The flexible material connecting part 100 may be preferably made of silicone, because silicone has low hardness and can effectively reduce vibration. It should be understood that other flexible materials, such as rubber or thermoplastic polyurethane (TPU) may also be selected and used. Soft plastic may also be selected and used, with a shore hardness of about 80 or less, but all that is necessary is that the hardness of the material is low enough to effectively reduce vibration.

The bottom of the flexible material connecting part 100 may be preferably connected to the top of the sound chamber 400 by means of threads or screws, or may be directly adhered to the top of the sound chamber 200 by encapsulation or by glue. The connection manner is not limited herein, as long as the flexible material connecting part 100 can be fixedly connected to the top of the sound chamber 400. Certainly, the connection of the flexible material connecting part 100 to the top of the sound chamber 400 herein refers to connection of edges. A gap needs to be kept between the bottom of the PCB 300 and the top of the sound chamber 400, and the distance between them is preferably more than 4 mm to 5 mm, so as to avoid an undesirable vibration reduction effect due to a smaller distance.

Figure 2:
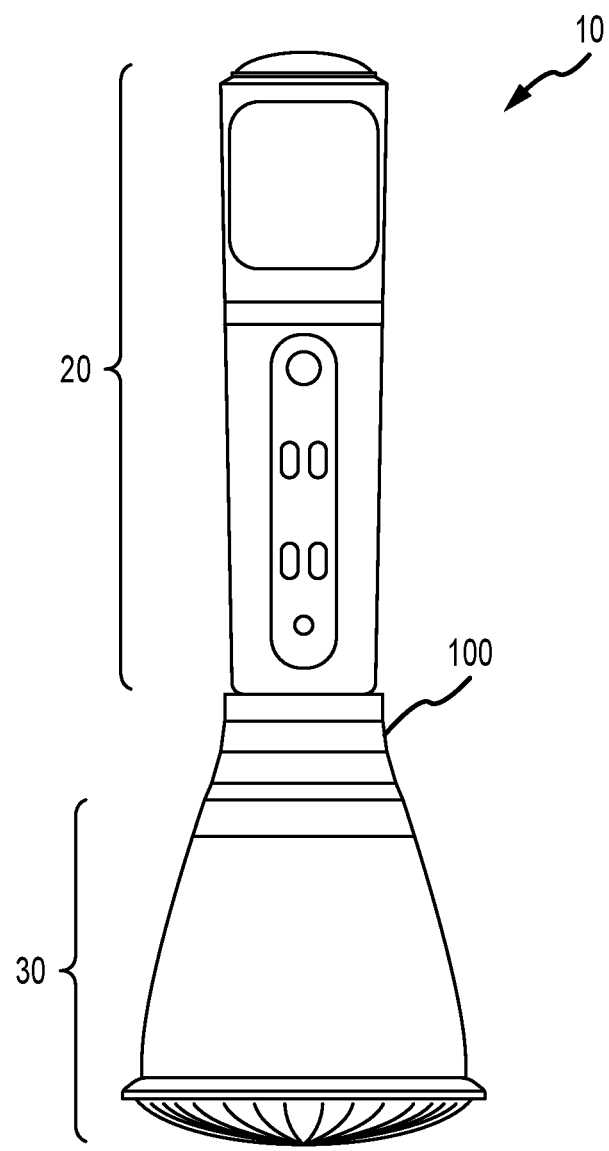
FIG. 2 is a schematic overall view of a microphone-and-sound-box integrated device in the present invention.

The aforementioned sound box 30 further includes a silicone ring 600, a plastic ring 700, and a trumpet-shaped mesh 800, where the silicone ring 600, the plastic ring 700, and the trumpet-shaped mesh 800 are fixedly connected to a bottom of the loudspeaker 500 in turn, and the bottom of the loudspeaker 500 is flush with the bottom of the sound chamber 400. A schematic overall view of the integrated karaoke device 10 is shown in FIG. 2. The plastic ring 700 and the silicone ring 600 may be attached to the bottom of the loudspeaker 500 by means of threads or screws, so as to seal the sound chamber 400. The trumpet-shaped mesh 800 can block external dust from entering the sound box 30, while also allowing sound produced by the loudspeaker 500 to penetrate therethrough. The silicone ring 600 is made from silicone having a low hardness, and may also be made from other flexible materials such as rubber, TPU, or soft plastic. The use of flexible material for the silicone ring 600 is useful so that when this part makes contact with a solid structural part, such as a desktop or floor, sound vibration generated by the sound chamber can also be reduced.

Therefore, by fixedly connecting a flexible material connecting part 100 between the bottom of the microphone 20 and the top of the sound chamber 400, and meanwhile, keeping a gap between the bottom of the PCB 300 and the top of the sound chamber 400, because the flexible material connecting part 100 can effectively reduce sound vibration, and the PCB 300 and the sound chamber 400 are not in contact, but instead have a gap kept therebetween, sound vibration generated by the sound box 30 cannot be transmitted to the upper part of the integrated karaoke device 10, and when a person sings aloud, because a gap is kept between the bottom of the PCB 300 and the top of the sound chamber 400, and because the top of the sound chamber 400 is fixedly connected to the bottom of the microphone 20 by means of the flexible material connecting part, vibration that is transmitted to the microphone 20 from the sound box 30 can be effectively eliminated, and thus sound vibration generated by the sound box 30 is not conducted to the microphone 20 through a solid structural part, thereby effectively inhibiting squealing.

Figure 3:
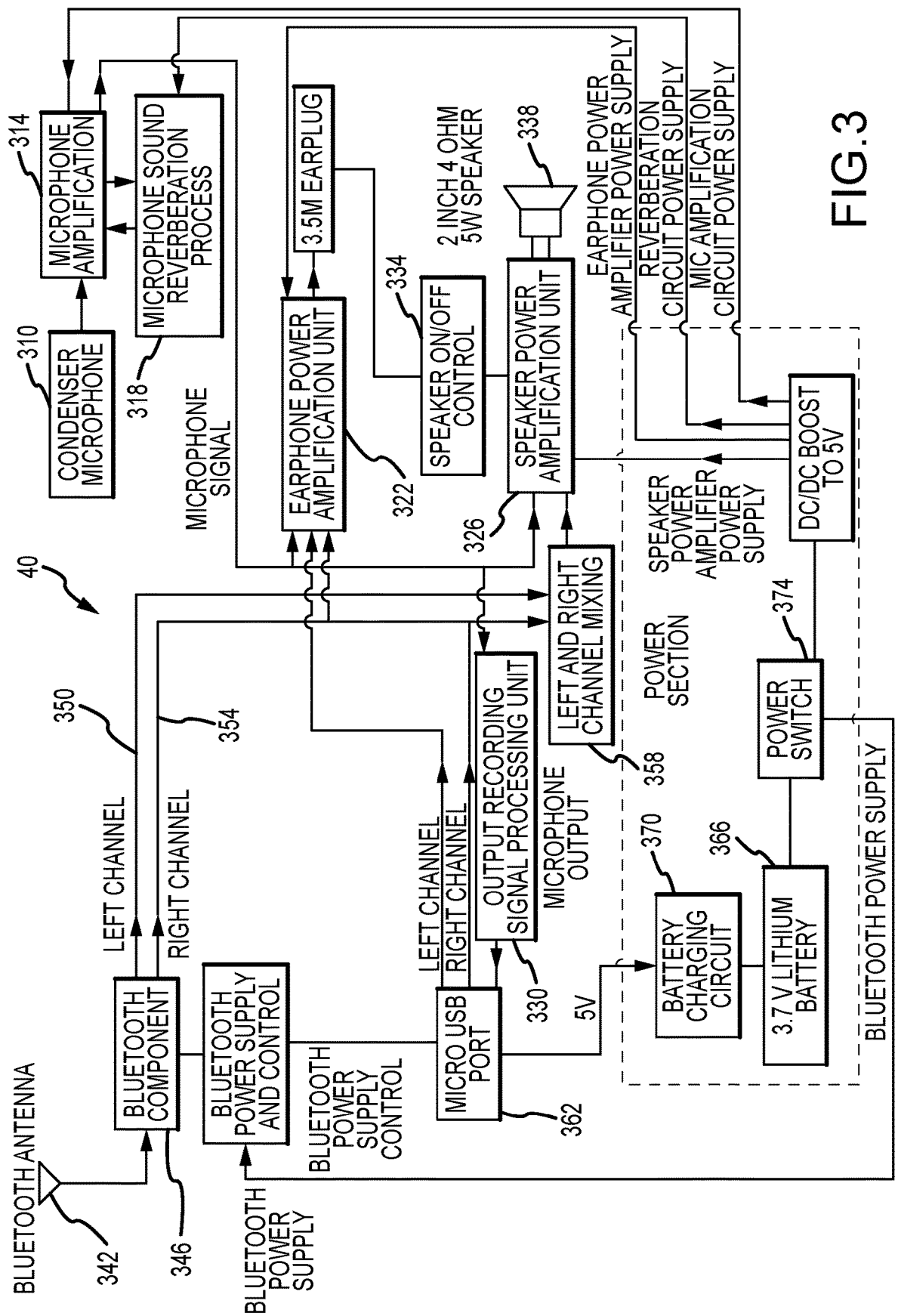
FIG. 3 is a circuit block diagram of a microphone-and-sound-box integrated device in the present invention.

Preferably, a circuit board inside the microphone 20 is further provided with a Bluetooth module used for performing a wireless Bluetooth communication connection to a Bluetooth communication device such as a mobile phone. A block diagram illustrating the principle of an internal circuit 40 of the integrated device is shown in FIG. 3. When a sound is input from a pickup of the microphone 20, the sound or microphone signal enters a condenser microphone 310. The signal first is subjected to a microphone sound reverberation process 318 in microphone amplification unit 314, after which the microphone signal is output to three units: one output to an earphone power amplification unit 322, one output to a speaker power amplification unit 326, and one output to an output recording signal processing unit 330. Afterwards, when a speaker is placed in an ON state by a speaker on/off control 334, the microphone signal is subjected to speaker power amplification at speaker power amplification unit 326 and then output to the speaker 338. When a Bluetooth function of the integrated karaoke device is used, after the integrated karaoke device 10 enables the Bluetooth module (which includes a Bluetooth antenna 342 and a Bluetooth component 346 in FIG. 3), and establishes a wireless Bluetooth communication connection to a mobile communication device such as a mobile phone (not shown), the sound transmitted by the mobile phone to the Bluetooth antenna 342 passes through the Bluetooth component 346 in the Bluetooth module and enters left and right channels 350 and 354, respectively, for mixing at left and right channel mixing unit 358, and later is subjected to speaker power amplification at speaker power amplification unit 326 and is then output to the speaker 338, together with the human sound (received through the condenser microphone 310), while the speaker is in the ON state as set at the speaker on/off control 334. When an external device, such as a mobile phone is not connected by Bluetooth, external music may also be input from a MICRO USB port 362 in a wired manner and subjected to speaker power amplification at speaker power amplification unit 326 before being output to the speaker 338, together with the human sound (received through the condenser microphone 310).

Besides, with the above-described first port (charging/audio input/audio output port, that is, the MICRO USB port 362 shown in FIG. 3) fitted in the first opening on the sidewall of the flexible material connecting part 100, power can be supplied to batteries 366 of the microphone 20 via the battery charging circuit 370 and various modules requiring power supply such as the Bluetooth module, and meanwhile, an external device such as a mobile phone can be connected for playing music. A power switch 374 is used to control the flow of power from the batteries 366 to other portions of the circuit 40.

In view of the above, by implementing the integrated karaoke device of the present invention, the top of the flexible material connecting part 100 is fixedly connected to the bottom of the microphone 20 by means of the plastic part 200 and the bottom of the flexible material connecting part 100 is fixed to the top of the sound chamber 400, and meanwhile, a gap is kept between the bottom of the PCB 300 that is also fixedly connected by means of the plastic part 200 and the top of the sound chamber 400. When a person sings aloud, because the flexible connecting part 100 can effectively eliminate vibration that is transmitted to the microphone 20 from the sound box 30, sound vibration generated by the sound box 30 can no longer be conducted to the microphone 20 through a solid structural part, and finally cannot be normally transmitted to the microphone 20, so that the production of a feedback self-excitation mechanism is fundamentally eliminated, thereby effectively inhibiting squealing.

Meanwhile, with this product, people can sing karaoke at any time and any place without the restriction of places or numerous devices, so that a user can sing a song loudly and share the joy with friends at any time no matter whether he is indoors or outdoors, on a journey or on a mountain top. Additionally, with mobile phones having become now indispensable for people to carry, a wireless Bluetooth connection to the mobile phone can be established by enabling a Bluetooth function of the integrated karaoke device, and a real karaoke effect is achieved with the accompaniment of music played from the mobile phone.

The embodiments of the present invention are described above with reference to the accompanying drawings, but the present invention is not limited to the specific implementation described above. The specific implementation described above is merely illustrative rather than restrictive. Those of ordinary skill in the art can make many forms without departing from the intention of the present invention or from the protective scope of the claims under the teachings of the present invention, and all these forms fall within the scope of the present invention.

What is claimed is:

1. An integrated karaoke device, comprising:
a microphone;
a sound box comprising a sound chamber and a loudspeaker, the sound chamber having a first end opposite a second end, and the loudspeaker positioned at the second end of the sound chamber;
a flexible material fixedly connecting at least a portion of the microphone to at least a portion of the sound chamber, the flexible material comprising one of silicone, rubber, thermoplastic polyurethane, and soft plastic, wherein the flexible material attenuates vibrations traveling from the sound box to the microphone, and wherein a sidewall of the flexible material comprises a first opening and a second opening;
a plastic ring fixedly connected to the loudspeaker;
a second flexible material positioned between the plastic ring and the loudspeaker; and
a printed circuit board positioned proximate the first end of the sound chamber, the printed circuit board having a battery, a first port for supplying power to charge the battery, and a second port, the printed circuit board fixedly connected to a portion of a plastic part such that the printed circuit board and the first end of the sound chamber are not in contact.

2. The integrated karaoke device of claim 1, wherein the sound box further comprises a substantially trumpet-shaped mesh fixedly connected to the loudspeaker.

3. The integrated karaoke device of claim 1, wherein there is at least a 4 mm gap between the printed circuit board and the top of the sound chamber.

4. The integrated karaoke device of claim 1, further comprising a Bluetooth module.

5. The integrated karaoke device of claim 1, wherein an end of the loudspeaker is flush with the second end of the sound chamber.

6. The integrated karaoke device of claim 1, wherein the sound chamber has a generally cylindrical shape.

7. The integrated karaoke device of claim 1, further comprising a mesh portion positioned proximate the second end of the sound chamber.

8. The integrated karaoke device of claim 1, further comprising an interface for receiving audio signals from an external device.

9. A system comprising:
a microphone;
a sound box comprising a sound chamber and a loudspeaker, the sound chamber having a generally cylindrical shape and having a first end opposite a second end, and the loudspeaker positioned at the second end of the sound chamber;
a flexible material fixedly connecting at least a portion of the microphone to at least a portion of the sound chamber, the flexible material comprising one of silicone, rubber, thermoplastic polyurethane, and soft plastic, wherein the flexible material attenuates vibrations traveling from the sound box to the microphone, and wherein a sidewall of the flexible material comprises a first opening and a second opening;
a plastic part positioned between the flexible material and the sound chamber; and
a printed circuit board positioned proximate the first end of the sound chamber, the printed circuit board having a first port and a second port, the printed circuit board spaced from the first end of the sound chamber such that the printed circuit board and the first end of the sound chamber are not in contact.

10. The system of claim 9, further comprising a Bluetooth module.

11. The system of claim 9, further comprising a plastic ring fixedly connected to the loudspeaker.

12. The system of claim 11, a second flexible material positioned between the plastic ring and the loudspeaker.

13. The system of claim 9, wherein the printed circuit board further comprises a battery and a port for supplying power to charge the battery.

14. The system of claim 9, wherein the printed circuit board is isolated from the sound box.

15. A device comprising:
a microphone;
a sound box comprising a sound chamber and a loudspeaker, the sound chamber having a first end opposite a second end, wherein an end of the loudspeaker is flush with the second end of the sound chamber;
a flexible material fixedly connecting at least a portion of the microphone to at least a portion of the sound chamber, wherein the flexible material attenuates vibrations traveling from the sound box to the microphone, and wherein a sidewall of the flexible material comprises a first opening and a second opening;
a mesh portion positioned proximate the second end of the sound chamber;
a plastic ring fixedly connected to the loudspeaker;
a second flexible material positioned between the plastic ring and the loudspeaker; and
a printed circuit board positioned proximate the first end of the sound chamber, the printed circuit board having a first port and a second port, the printed circuit board fixedly connected to a portion of a plastic part such that the printed circuit board and the first end of the sound chamber are not in contact.

16. The device of claim 15, wherein the sound chamber has a generally cylindrical shape.

17. The device of claim 15, further comprising an interface for receiving audio signals from an external device.

18. The integrated karaoke device of claim 15, the flexible material comprising one of silicone, rubber, thermoplastic polyurethane, and soft plastic.

19. The device of claim 15, wherein the printed circuit board is isolated from the sound box.

20. The device of claim 15, wherein the printed circuit board further comprises a battery and a port for supplying power to charge the battery.

\* \* \* \* \*